United States Patent
Imanishi

(10) Patent No.: US 12,498,702 B2
(45) Date of Patent: Dec. 16, 2025

(54) NUMERICAL CONTROL SYSTEM, AND INDUSTRIAL MACHINE CONTROL METHOD

(71) Applicant: FANUC CORPORATION, Yamanashi (JP)

(72) Inventor: Kazutaka Imanishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 226 days.

(21) Appl. No.: 18/255,335

(22) PCT Filed: Dec. 10, 2021

(86) PCT No.: PCT/JP2021/045663
§ 371 (c)(1),
(2) Date: May 31, 2023

(87) PCT Pub. No.: WO2022/131173
PCT Pub. Date: Jun. 23, 2022

(65) Prior Publication Data
US 2024/0028000 A1   Jan. 25, 2024

(30) Foreign Application Priority Data
Dec. 15, 2020  (JP) .................. 2020-207641

(51) Int. Cl.
*G05B 19/418*  (2006.01)
*G05B 19/414*  (2006.01)

(52) U.S. Cl.
CPC ..... *G05B 19/41825* (2013.01); *G05B 19/414* (2013.01)

(58) Field of Classification Search
CPC ............ G05B 19/41825; G05B 19/414; G05B 2219/36242
See application file for complete search history.

(56) References Cited

U.S. PATENT DOCUMENTS

| | | | | |
|---|---|---|---|---|
| 4,786,847 | A | * 11/1988 | Daggett | ............. G05B 19/4141 901/3 |
| 2014/0215200 | A1 | * 7/2014 | Nakamura | ............ G06F 9/4411 713/2 |

(Continued)

FOREIGN PATENT DOCUMENTS

| CN | 105500088 A | 4/2016 |
|---|---|---|
| JP | H06-043919 A | 2/1994 |

(Continued)

OTHER PUBLICATIONS

International Search Report issued in PCT/JP2021/045663; mailed Mar. 8, 2022.

*Primary Examiner* — Khoi H Tran
*Assistant Examiner* — Tristan J Greiner
(74) *Attorney, Agent, or Firm* — Studebaker Brackett PLLC

(57) ABSTRACT

A numerical control system 1 is provided with a numerical control device 5 and a robot control device 6
The numerical control device 5 is provided with: a robot command generating unit 55 which generates a robot command for each robot command block; a robot program launch command unit 56; and a data transmitting and receiving unit 59 which transmits to the robot control device 6, in advance as a batch, a plurality of robot commands generated on the basis of a plurality of robot command blocks, as a robot command group, and then transmits a program launch command to the robot control device 6. The robot control device 6 is provided with: a robot program generating unit 61 which generates a robot program on the basis of the robot commands; and an operation control unit 65 which, after a robot program based on the robot command group has been generated, operates the robot program upon receipt of the program launch command.

9 Claims, 11 Drawing Sheets

(56) References Cited

U.S. PATENT DOCUMENTS

| | | | | |
|---|---|---|---|---|
| 2015/0101175 A1* | 4/2015 | Xi | ............................ | B21J 15/28 |
| | | | | 29/243.54 |
| 2017/0248935 A1* | 8/2017 | Koide | ................. | G05B 19/4103 |
| 2018/0203430 A1* | 7/2018 | Kageyama | ......... | G05B 19/4067 |
| 2019/0039198 A1* | 2/2019 | Sugiura | ................ | B23Q 17/249 |
| 2019/0369603 A1* | 12/2019 | Uno | ..................... | G05B 19/182 |

FOREIGN PATENT DOCUMENTS

| | | | |
|---|---|---|---|
| JP | 2001-154717 A | 6/2001 | |
| JP | 2008-152733 A | 7/2008 | |
| JP | 6647472 B1 | 2/2020 | |
| JP | 2020071533 A * | 5/2020 | ............ B25J 9/1605 |
| WO | WO-2020144772 A1 * | 7/2020 | ....... G05B 19/41825 |

* cited by examiner

FIG. 3

NUMERICAL CONTROL PROGRAM
FOR MACHINE TOOL

```
N100 M6 T3;
N101 S1500;

N102 G00 X100.Y100.Z0.
N103 G01 X200.Y200.F2000;
N104 G01 X300.Y200.F2000;
N105 G00 X0.0 Y0.0 Z0.0

N106 M100 P12 (WAITING)
N107 M30;(END OF PROGRAM)
```

NUMERICAL CONTROL PROGRAM
FOR ROBOT
(MAIN PROGRAM)

```
N10   M300 P2000; (BATCH PROCESSING)

N11   M30; (END OF PROGRAM)
```

FIG. 4

NUMERICAL CONTROL PROGRAM
FOR MACHINE TOOL
(SUB-PROGRAM)

| | |
|---|---|
| N20 | O2000 |
| N21 | G68.8;(JOINT COORDINATE SYSTEM) |
| N22 | G0 J1=_J2=_J3=_J4=_J5=_J6=_; |
| N23 | M100 P12(WAITING) |
| N24 | G68.9;(ORTHOGONAL COORDINATE SYSTEM) |
| N25 | G0 X_Y_Z_A_B_C_P_F4000; |
| | ... |
| N30 | G04 P1000 (STANDBY) |
| N31 | G68.9;(ORTHOGONAL COORDINATE SYSTEM) |
| N32 | G1 X_Y_Z_A_B_C_P_F4000; |
| N33 | G300.0(HAND OPENING) |
| N34 | G1 X_Y_Z_A_B_C_P_F4000; |
| N35 | G300.1(HAND CLOSING) |
| N36 | G1 X_Y_Z_A_B_C_P_F4000; |
| | ... |
| N40 | M99;(END OF SUB-PROGRAM) |

FIG. 8

NUMERICAL CONTROL PROGRAM
(MAIN PROGRAM)

N200   M300 P3000; (BATCH PROCESSING)

N201   M6 T3;
N202   S1500;

N203   G00 X100.Y100.Z0.
N204   G01 X200.Y200.F2000;
N205   G01 X300.Y200.F2000;
N206   G00 X0.0 Y0.0 Z0.0

N207   M300 P4000; (BATCH PROCESSING)

N208   M30;(END OF PROGRAM)

FIG. 9A

NUMERICAL CONTROL PROGRAM
(SUB-PROGRAM)

| N50 | O3000 |
|---|---|
| N51 | G68.8;(JOINT COORDINATE SYSTEM) |
| N52 | G0 J1=_J2=_J3=_J4=_J5=_J6=_; |
| N53 | G68.9;(ORTHOGONAL COORDINATE SYSTEM) |
| N54 | G0 X_Y_Z_A_B_C_P_F4000; |
|  | ... |
| N60 | M99;(END OF SUB-PROGRAM) |

FIG. 9B

NUMERICAL CONTROL PROGRAM
(SUB-PROGRAM)

| N70 | O4000 |
|---|---|
| N71 | G68.9;(ORTHOGONAL COORDINATE SYSTEM) |
| N72 | G1 X_Y_Z_A_B_C_P_F4000; |
| N73 | G300.0(HAND OPENING) |
| N74 | G1 X_Y_Z_A_B_C_P_F4000; |
| N75 | G300.1(HAND CLOSING) |
| N76 | G1 X_Y_Z_A_B_C_P_F4000; |
|  | ... |
| N80 | M99;(END OF SUB-PROGRAM) |

NUMERICAL CONTROL SYSTEM, AND INDUSTRIAL MACHINE CONTROL METHOD

TECHNICAL FIELD

The present disclosure relates to a numerical control system and a control method for an industrial machine.

BACKGROUND ART

In recent years, in order to promote automation of a machining site, a numerical control system has been desired which links and controls operation of a machine tool machining a workpiece and operation of a robot provided in the vicinity of this machine tool (for example, refer to Patent Document 1).

Generally, a numerical control program for controlling a machine tool and a robot program for controlling a robot differ in programming language. In order to interlock the operation of a machine tool and the operation of a robot, it is necessary for the operator to familiarize with both the numerical control program and robot program.

Patent Document 1 discloses a numerical control device which controls both a machine tool and robot by the numerical control program. More specifically, the numerical control system disclosed in Patent Document 1 generates a robot command in accordance with the numerical control program in the numerical control device, generates a robot program based on this robot command in the robot control device, and controls the operation of the robot in accordance with this robot program. According to the numerical control system shown in Patent Document 1, it is possible to also control a robot without familiarizing with the robot program, so long as being a user familiarized with the numerical control program.

Patent Document 1: Japanese Patent No. 6647472

DISCLOSURE OF THE INVENTION

Problems to be Solved by the Invention

FIG. 11 is an example of a time chart showing the sequence of various processing executed by the numerical control device and robot control device upon controlling operation of a robot in a conventional numerical control system.

First, at times t0 to t1, one command block included in a numerical control program created in advance is read out and analyzed in the numerical control device. Next, at times t1 to t2, the numerical control device and robot control device execute first handshake processing for starting the transfer of robot commands. Next, at times t2 to t3, the numerical control device generates a robot command according to the analysis results of the command block of times t0 to t1, and transfers the created robot command to the robot control device. Next, at times t3 to t4, the numerical control device and robot control device execute second handshake processing for ending the transfer of robot commands.

In addition, between times t4 to t5, the robot control device analyzes the robot commands received at times t3 to 4, and subsequently generates a robot program according to the analysis results of the robot commands between times t5 to t6. Next, between times t6 to t7, the numerical control device and robot control device execute third handshake processing for ending the generation of the robot program on the robot control device side. It is thereby possible to confirm that the generation of the robot program according to the robot commands has ended on the numerical control device side.

Between times t7 to t8, the numerical control device sends a robot program launch command for launching the robot program created based on the previously sent robot commands, in the robot control device to the robot control device. Subsequently, at times t8 and later, the robot control device controls the operation of the robot based on the launched robot program, and the numerical control device confirms whether or not execution of the robot program in the robot control device has completed.

With the conventional numerical control system, it is necessary to execute handshake processing at least three times, upon controlling the operation of a robot based on one command block written in the numerical control program in the above way. For this reason, with the conventional numerical control system, since the execution frequency of handshake processing also increases as the number of command blocks included in the numerical control program increases, the time required in communication processing lengthens by this amount, and there is concern over the cycle time of robot control also lengthening.

The present disclosure has an object of providing a numerical control system and a control method for an industrial machine which can shorten the time required in communication processing between a numerical control device and a robot control device, and thus also shorten the cycle time of robot control.

Means for Solving the Problems

One aspect of the present disclosure provides a numerical control system includes: a numerical control device configured to control operation of a machine tool, and generate a robot command for controlling operation of a robot; a robot control device configured to be communicable with the numerical control device and control operation of the robot based on the robot command; a robot command generation unit configured to generate, based on a numerical control program including a plurality of robot command blocks for the robot, the robot command for each of the robot command blocks; a robot program launch command unit configured to generate a program launch command; a first communication unit configured to send the program launch command from the numerical control device to the robot control device, after bundling in advance a plurality of the robot commands generated based on a plurality of the robot command blocks belonging to a designated block range as a robot command group and sending from the numerical control device to the robot control device; a second communication unit configured to receive the robot command and the program launch command; a robot program generation unit configured to generate a robot program based on the robot command received by the second communication unit; and an operation control unit configured to, in response to receiving the program launch command by the second command unit after the robot program is generated based on the robot command group by the robot program generation unit, launch the robot program, and control operation of the robot based on the robot program.

One aspect of the present disclosure provides a control method for an industrial machine using a numerical control system including a numerical control device that controls operation of a machine tool and a robot control device which is communicable with the numerical control device and controls operation of a robot, to control operation of the machine tool and the robot, the control method comprising the steps of: the numerical control device generating, based on a numerical control program including a plurality of robot command blocks for the robot, a robot command for controlling operation of the robot for each of the robot command blocks; the numerical control device bundling in advance a plurality of the robot commands generated based on a plurality of the robot command blocks belonging to a designated block range as a robot command group, and sending to the robot control device; the robot control device receiving the robot command group and generating a robot program based on a plurality of the robot commands belonging to the robot command group; the numerical control device sending a program launch command to the robot control device, after the robot program is generated based on the robot command group in the robot control device; and the robot control device launching the robot program in response to receiving the program launch command, and controlling operation of the robot based on the robot program.

Effects of the Invention

In the one aspect of the present disclosure, the robot command generation unit generates a robot command for every robot command block based on the numerical control program including a plurality of robot command blocks for the robot, and the first communication unit bundles in advances the plurality of robot commands generated based on the plurality of robot command blocks belonging to a designated block range as a robot command group, and sends this from the numerical control device to the robot control device. In other words, the first communication unit, prior to starting control of operation of the robot based on the robot command sent from the numerical control device in the robot control device (i.e. before starting running of robot control device), sends all of the plurality of robot commands constituting the robot command group to the robot control device. In addition, the robot program generation unit generates a robot program based on the robot commands received by the second communication nit, the operation control unit launches the robot program in response to receiving the program launch command by the second communication unit, after the robot program is generated based on the robot command group, and controls the operation of the robot based on this robot program. According to one aspect of the present disclosure, by bundling in advance the robot command group constituted by several robot commands and sending to the side of the robot control device from the side of the numerical control device, since it is possible to drastically reduce the execution frequency of handshake processing, which had been necessary every time sending a robot command based on one robot command block conventionally, it is possible to shorten the time required in communication processing between the numerical control device and robot control device by this amount, and consequently also shorten the cycle time of the robot control.

BRIEF DESCRIPTION OF THE DRAWINGS

FIG. 3 is a view showing an example of a main program of a numerical control program for a machine tool and a numerical control program for a robot;

FIG. 4 is a view showing an example of a sub-program of a numerical control program for a robot;

FIG. 8 is a view showing an example of a main program of a numerical control program read by the numerical control device;

FIG. 9A is a view showing an example of a sub-program read by the numerical control device;

FIG. 9B is a view showing a sub-program read by the numerical control device;

PREFERRED MODE FOR CARRYING OUT THE INVENTION

First Embodiment

Hereinafter, a numerical control system according to a first embodiment of the present disclosure will be explained by referencing the drawings.

Figure 1:
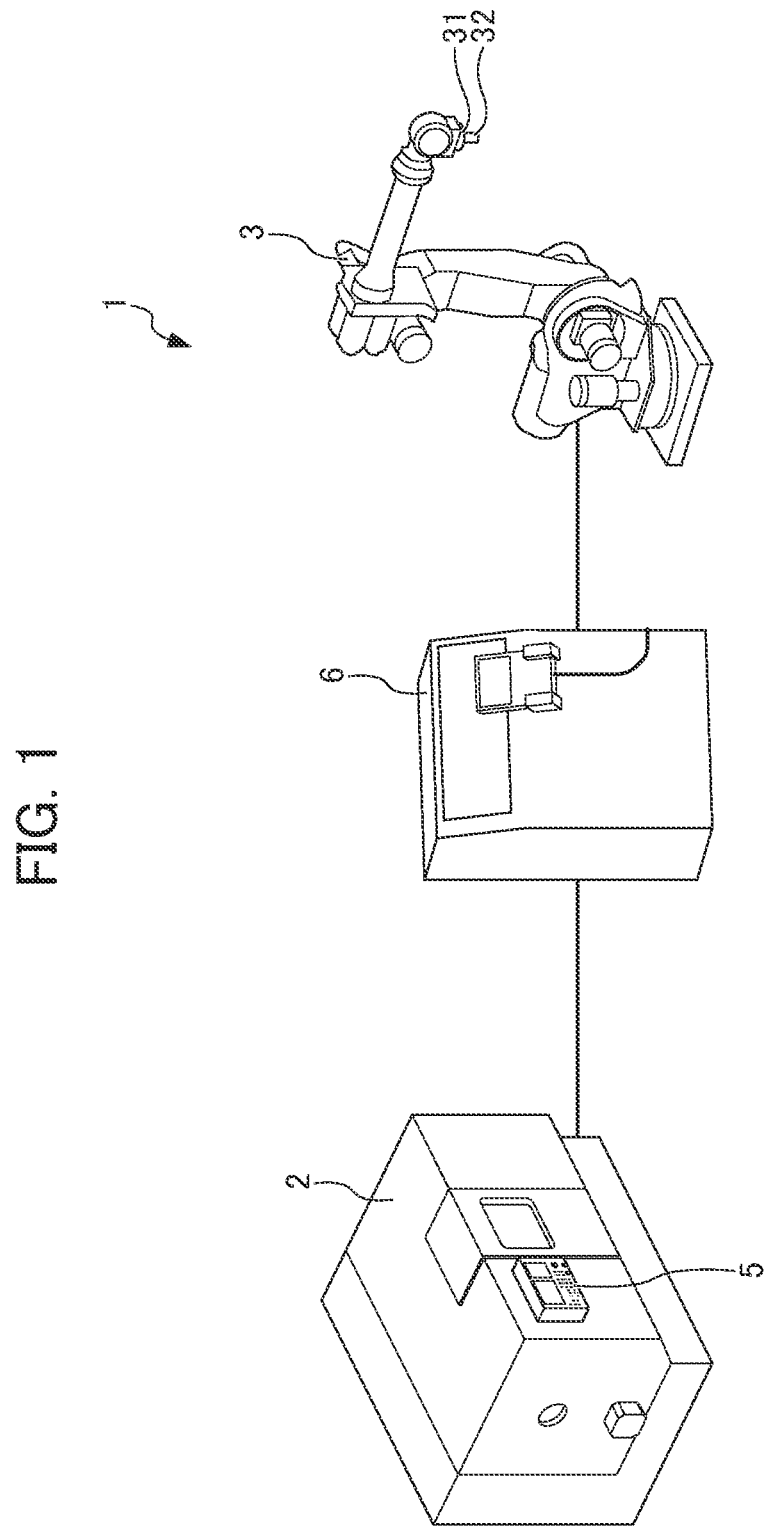
FIG. 1 is a schematic diagram of a numerical control system according to a first embodiment of the present disclosure.

FIG. 1 is a schematic diagram of a numerical control system 1 according to the present embodiment.

The numerical control system 1 includes: a machine tool 2; a numerical control device (CNC) 5 which controls operation of this machine tool 2; a robot 3 provided in the vicinity of the machine tool 2; and a robot control device 6 connected communicably with the numerical control device 5. The numerical control device 5 controls operation of the machine tool 2 based on a predetermined numerical control program, generates commands for the robot control device 6 for controlling operation of the robot 3, and sends this to the robot control device 6. The robot control device 6 controls operation of the robot 3 according to commands sent from the numerical control device 5.

The machine tool 2 machines a workpiece (not shown) according to machine tool control signals sent from the numerical control device 5. Herein, the machine tool 2 is a lathe, drill press, milling machine, grinding machine, laser processing machine, injection molding machine or the like.

The robot 3 operates under the control of the robot control device 6, and performs a predetermined operation on the workpiece machined by the machine tool 2, for example. The robot 3 is an articulated robot, for example, and a tool 32 for holding, machining or inspecting the workpiece is mounted to an arm tip end 31 thereof. Hereinafter, a case of the robot 3 being a 6-axis articulated robot will be explained; however, it is not to be limited thereto. In addition, hereinafter, a case of the robot 3 being a 6-axis articulated robot will be explained; however, the number of axes is not limited thereto.

The numerical control device 5 and robot control device 6 are each a computer configured by hardware such as an arithmetic processing means such as a CPU (Central Processing Unit), an auxiliary storage means such as HDD (Hard Disk Drive) or SSD (Solid State Drive) storing various programs, a main storage means such as RAM (Random Access Memory) for storing data which is temporarily necessitated upon the arithmetic processing means executing a program, an operation means such as a keyboard on which an operator performs various operations, and a display means such as a display displaying various information to the operator. This robot control device 6 and numerical control device 5 are made able to send and receive various signals with each other by Ethernet (registered trademark), for example.

Figure 2:
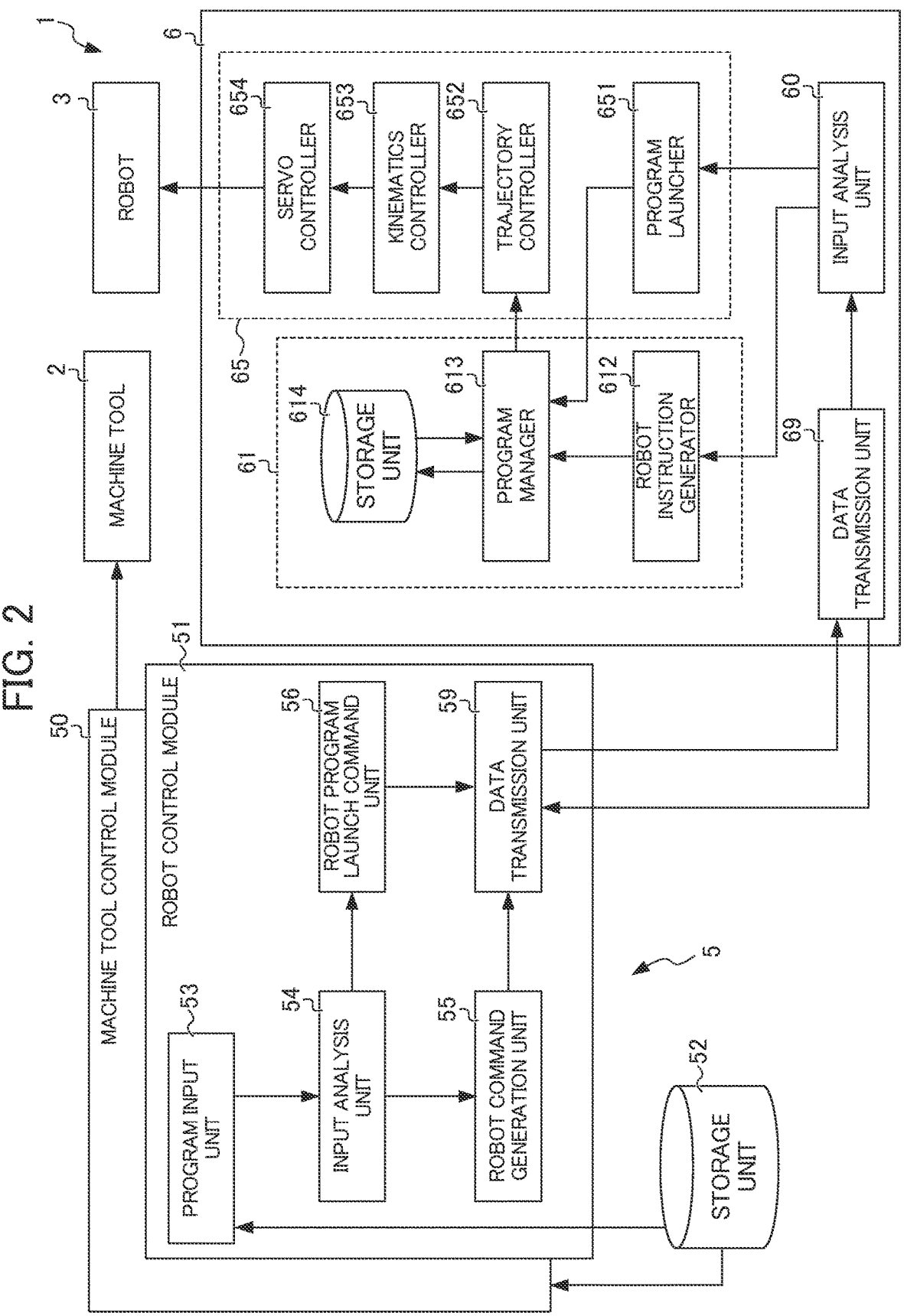
FIG. 2 is a functional block diagram of a numerical control device and a robot control device.

FIG. 2 is a functional block diagram of the numerical control device 5 and the robot control device 6.

The numerical control device 5 generates various commands for controlling operation of the robot 3 and tool 32 in accordance with the sequence explained below, and sends the generated commands to the robot control device 6. The robot control device 6 generates robot control signals for controlling operation of the robot 3 in accordance with the sequence explained below based on the commands sent from the numerical control device 5, generates I/O signals for controlling operation of the tool 32, and inputs the generated robot control signal and I/O signal to the robot 3. The robot control device 6 thereby controls operation of the robot 3 and tool 32.

First, the detailed configuration of the numerical control device 5 will be explained. In the numerical control device 5 as shown in FIG. 2, various functions such as of a machine tool control module 50 as a control system of the machine tool 2, a robot control module 51 as a control system of the robot 3, a storage unit 52 and the like are realized by the above-mentioned hardware configuration.

In the storage unit 52, several numerical control programs created based on the operation by an operator are stored, for example. More specifically, the storage unit 52 mainly stores numerical control programs for a machine tool configured by a plurality of command blocks (hereinafter also referred to as "machine tool command block") to the machine tool 2; numerical control program for a robot configured by a plurality of command blocks (hereinafter also referred to as "robot command block") to the robot 3, etc. This numerical control program for the machine tool and numerical control program for the robot are written in a common programming language (for example, G code, M code or the like).

The numerical control program for the machine tool is written based on the machine tool coordinate system as a first coordinate system with an origin of a reference point decided on the machine tool 2 or in the vicinity of the machine tool 2. In other words, in the numerical control program for the machine tool, the position and posture of a control point of the machine tool 2 is written by a coordinate value in the machine tool coordinate system.

The numerical control program for the robot is written based on the robot coordinate system as a second coordinate system different from the machine tool coordinate system. In other words, in the numerical control program for the robot, the position and posture of the control point of the robot 3 (for example, arm tip end 31 of robot 3) are written by the coordinate value of the robot coordinate system different from the machine tool coordinate system. This robot coordinate system is a coordinate system with an origin of a reference point decided on the robot 3 or in the vicinity of the robot 3. It should be noted that, hereinafter, a case of the robot coordinate system differing from the machine tool coordinate system will be explained; however, the present disclosure is not limited thereto. The robot coordinate system may be integral with the machine tool coordinate system. In other words, the origin of the robot coordinate system and coordinate axis directions may be made to match the origin and coordinate axis directions of the machine tool coordinate system.

In addition, the robot coordinate system in this numerical control program for the robot is switchable between two or more coordinate systems having different control axes. More specifically, the position and posture of the control point of the robot 3 in the numerical control program for the robot can be designated by orthogonal coordinate format or joint coordinate format.

In the joint coordinate format, the position and posture of the control point of the robot 3 are designated by the six real number coordinate values with components of the rotation angle values of the six joints of the robot 3 (J1, J2, J3, J4, J5, J6).

In the orthogonal coordinate format, the position and posture of the control point of the robot 3 are designated by a total of six real number coordinate values with components of the three coordinate values (X, Y, Z) along the three orthogonal coordinate axes, and three rotation angle values (A, B, C) around each orthogonal coordinate axis.

Herein, under the joint coordinate format, in order to directly designate the rotation angle of each joint of the robot 3, the axis arrangement of each arm and/or wrist of the robot 3, and rotation number of a joint rotatable by at least 360 degrees (hereinafter these are abbreviated and referred to as "form of robot 3") are also uniquely fixed. In contrast, under the orthogonal coordinate format, due to designating the position and posture of the control point of the robot 3 by six coordinate values (X, Y, Z, A, B, C), the form of the robot 3 cannot be uniquely fixed. Therefore, with the numerical control program for the robot, it becomes possible to designate the form of the robot 3 by the form value P, which is an integer value of a predetermined number of digits. Therefore, the position and posture of the control point of the robot 3 as well as the form of the robot 3 are represented by the six coordinate values (J1, J2, J3, J4, J5, J6) under the joint coordinate format, and are represented by the six coordinate values and one form value (X, Y, Z, A, B, C, P) under the orthogonal coordinate format.

With the numerical control program for the robot, it becomes possible to set the coordinate format by G code "G68.8" and "G68.9". More specifically, by inputting G code "G68.8", the coordinate format is set to the joint coordinate format, and by inputting G code "G68.9", the coordinate format is set to the orthogonal coordinate format. The G code "G68.8" and "G68.9" for setting these coordinate formats are modal. Therefore, the coordinate format is maintained after setting the coordinate format by these G code to the joint coordinate format or the orthogonal coordinate format, until the coordinate format is changed by these G code again. It should be noted that, in the present embodiment, in the case of the G code for setting these coordinate formats not being written in the numerical control program for the robot, the coordinate format shall be set automatically to the orthogonal coordinate format; however, it is not limited thereto.

The machine tool control module 50 generates a machine tool control signal for controlling operation of the machine tool 2 mainly, in accordance with the numerical control program for the machine tool, and inputs to an actuator (not shown) of the machine tool 2. More specifically, the machine tool control module 50 reads out the numerical control program for the machine tool stored in the storage unit 52, and generates the machine tool control signal by analyzing a command classification based on this numerical control program. The machine tool 2 operates according to the machine tool control signal sent from the machine tool control module 50 to machine a workpiece (not shown).

The robot control module 51 generates various commands for controlling operation of the robot 3 and tool 32 in accordance with the numerical control program for the robot, and sends this to the robot control device 6. More specifically, the robot control module 51 includes a program input unit 53, input analysis unit 54, robot command generation unit 55, robot program launch command unit 56, and data transmission unit 59 as a first communication unit.

The program input unit 53 reads out the numerical control program for the robot configured by several robot command blocks from the storage unit 52, and inputs this successively to the input analysis unit 54.

The input analysis unit 54 analyzes the command classification for every robot command block based on the numerical control program for the robot inputted from the program input unit 53, and sends the analysis results thereof to the robot command generation unit 55 and robot program launch command unit 56 for every robot command block.

The robot command generation unit 55 generates a robot command for every robot command block based on the analysis result for every robot command block sent from the input analysis unit 54, and writes the generated robot command into the data transmission unit 59.

The robot program launch command unit 56 generates, at a predetermined timing the robot program launch command serving as a trigger for launching, on the side of the robot control device 6, the robot program generated on the side of the robot control device 6 based on the robot command generated by the robot command generation unit 55, and then writes the generated robot program launch command into the data transmission unit 59.

The data transmission unit 59 transmits various commands and data mutually with the data transmission unit 69 of the robot control device 6 under handshake communication. The data transmission unit 59, when a robot command or robot program launch command is written in the aforementioned way by the robot command generation unit 55 or robot program launch command unit 56, executes predetermined communication processing including the first to third handshake processing explained by referencing FIG. 11, and sends this robot command or robot program launch command to the data transmission unit 69 of the robot control device 6.

As explained later, when sending the robot command from the data transmission unit 59 to the data transmission unit 69, a robot program according to the received robot command is generated on the side of the robot control device 6. In addition, after sending the robot command, when sending the robot program launch command from the data transmission unit 59 to the data transmission unit 69, the robot program generated by the above such sequence is launched on the side of the robot control device 6 to control operation of the robot 3 and tool 32 based on this robot program.

Herein, a send processing method of the robot command robot program launch command in the data transmission unit 59 can be switched between sequential processing and batch processing.

Figure 11:
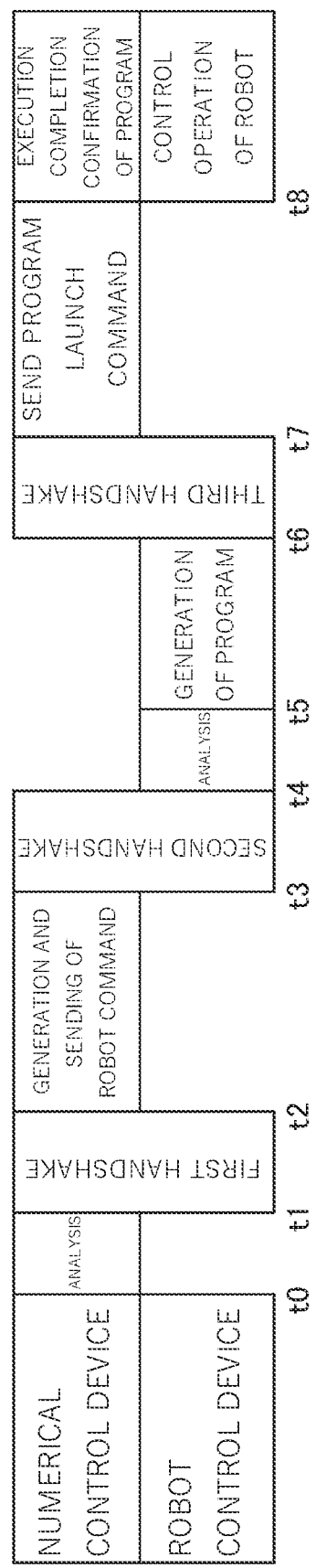
FIG. 11 is a time chart showing the sequence of various processing executed by the numerical control device and robot control device upon controlling the operation of a robot in a conventional numerical control system.

Under sequential processing, the data transmission unit 59 executes communication processing in accordance with the sequence explained by referencing FIG. 11, and sends the robot command and robot program launch command to the data transmission unit 69. In other words, under the sequential processing, the data transmission unit 59, every time one robot command is written by the robot command generation unit 55, sends this robot command to the data transmission unit 69, and then sends the robot program launch command to the data transmission unit 69. In other words, under the sequential processing, the data transmission unit 59 sends one robot command and robot program launch command for every one robot command block to the data transmission unit 69.

In contrast, under the batch processing, the data transmission unit 59 bundles in advance several robot commands generated based on several robot command blocks belonging to a designated block range decided in the numerical control program for the robot, as a robot command group and sends to the data transmission unit 69, followed by sending, to the data transmission unit 69, a robot program launch command for launching, on the side of the robot control device 6, the robot program generated on the robot control device 6 side based on this robot command group. In other words, the data transmission unit 59 sends several robot commands constituting a robot command group all to the robot control device 6, before launching control of operation of the robot 3 (i.e. before startup of robot control device 6) based on the robot command sent from the numerical control device 5 in the robot control device 6. Herein, the designated block range according to batch processing can be decided by a predetermined batch processing designation command (for example, M code "M300" described later), based on the numerical control program for the robot. It should be noted that the present embodiment explains a case of designating the designated block range by sub block units according to batch processing designation code, i.e. case of establishing all robot command blocks included in a sub program as designated block range; however, the present disclosure is not limited thereto. The designated block range can be directly designated in robot command block units by the batch processing command commands.

In the case of sending the robot command and robot program launch command from the data transmission unit 59 to the data transmission unit 69 under sequential processing in the above way, it is necessary to execute the first to third handshake processing one by one for every one robot command block. For this reason, when trying to process several robot command blocks under sequential processing, the execution frequency of first to third handshake processing also increases according to the number of robot command blocks, and consequently, the cycle time of robot control also lengthens.

In contrast, in the case of sending the robot command and robot program launch command from the data transmission unit 59 to the data transmission unit 69 under batch processing, since it is possible to bundle several robot commands and send from the data transmission unit 59 to the data transmission unit 69 as a robot command group, the execution frequency of first to third handshake processing decreases compared to sequential processing, and consequently, the cycle time of the robot control can also be shortened.

It should be noted that, in the case of sending the robot command and robot program launch command from the data transmission unit 59 to the data transmission unit 69 under batch processing in the above way, the analysis of robot command blocks in the input analysis unit 54, generation of robot commands in the robot command generation unit 55, generation of robot program launch command in the robot program launch command unit 56, as well as sending of the robot command group and robot program launch command in the data transmission unit 59 are preferably executed during execution stop of the numerical control program for the machine tool in the machine tool control module 50, or during stop of axial movement of the machine tool 2.

Next, the configuration of the robot control device 6 will be explained in detail. As shown in FIG. 2, various functions such as of the input analysis unit 60, robot program generation unit 61, operation control unit 65 and data transmission unit 69 as a second communication unit are realized by the above hardware configuration in the robot control device 6.

The input analysis unit 60 analyzes the command sent from the numerical control device 5 via the data transmission unit 69, and sends the analysis result to the robot program generation unit 61 and operation control unit 65.

More specifically, the input analysis unit 60, when a robot command or a robot command group compiling a plurality of this robot command is inputted from the data transmission unit 69, sends this robot command or robot command group to the robot program generation unit 61. The robot program generation unit 61, when the robot command or robot command group is inputted from the input analysis unit 60, generates a robot program according to this robot command or robot command group in accordance with the sequence described later.

The input analysis unit 60, when the robot program launch command is inputted from the data transmission unit 69, sends this robot program launch command to the operation control unit 65. The operation control unit 65 launches the robot program generated by the above-mentioned robot program generation unit 61 in accordance with the sequence explained later, when the robot program launch command is inputted from the input analysis unit 60, and controls operation of the robot 3 and tool 32 in accordance with this robot program.

The data transmission unit 69 transmits various commands and data mutually with the data transmission unit 59 of the numerical control device 5 under the handshake communication. The data transmission unit 59 and data transmission unit 69 send and receive robot commands, robot command groups and robot program launch commands, by executing the first to third handshake processing in accordance with the following sequence.

More specifically, the data transmission unit 59 and data transmission unit 69, after executing the first handshake processing, start sending of the robot command or robot command group to the data transmission unit 69 from the data transmission unit 59. In addition, the data transmission unit 59 and data transmission unit 69 execute the second handshake processing, after sending of the robot command or robot command group from the data transmission unit 59 to the data transmission unit 69 has completed. Subsequently, the data transmission unit 59 and data transmission unit 69 execute the third handshake processing, after the generation of the robot program has completed based on the robot command or robot command group received according to the above sequence by the robot program generation unit 61. By executing this third handshake processing, it is possible to grasp on the side of the numerical control device 5 that generation of the robot program has completed on the side of the robot control device 6. Therefore, the data transmission unit 59 sends the robot program launch command to the data transmission unit 69 after executing this third handshake processing.

The data transmission unit 69, when receiving the robot command, robot command group and robot program launch command from the data transmission unit 59 under the above such handshake communication, inputs these commands successively to the input analysis unit 60. In addition, the input analysis unit 60 sends the robot command or robot command group to the robot program generation unit 61 in the aforementioned way, and sends the robot program launch command to the operation control unit 65.

The robot program generation unit 61 includes a robot instruction generator 612, program manager 613 and storing section 614, and generates a robot program according to the robot command or robot command group sent from the input analysis unit 60 using these.

The robot instruction generator 612, when a robot command is inputted from the input analysis unit 60, notifies the robot instruction corresponding to the inputted robot command to the program manager 613. In addition, the robot instruction generator 612, when a robot command group is inputted from the input analysis unit 60, notifies the sequence program manager 613 of several robot instructions corresponding to the several robot commands included in the inputted robot command group.

The program manager 613, when a robot instruction is inputted from the robot instruction generator 612, adds the robot instruction inputted to the robot program stored in the storage section 614. A robot program according to the robot command or robot command group sent from the numerical control device 5 is thereby generated in the storage section 614.

The numerical control unit 65 includes a program launcher 651, trajectory controller 652, kinematic controller 653 and servo controller 654, and controls operation of the robot 3 using these.

The program launcher 651, when the robot program launch command is inputted from the input analysis unit 60, sends the program launch notification to the program manager 613 in order to launch the robot program generated by the robot program generation unit 61, based on the robot command or robot command group sent from the numerical control device 5 before this robot program launch command. The program manager 613 launches the robot program stored in the storage section 614, in response to receiving this program launch notification. The program manager 613 creates an operation plan of the robot 3 and operation plan of the tool 32 according to the robot command or robot command group, by successively executing the robot instruction written in the booted robot program. In addition, the program manager 613 sends the generated operation plan of the robot 3 to the trajectory controller 652, and sends the generated operation plan of the tool 32 to the servo controller 654.

The trajectory controller 652, when receiving the operation plan of the robot 3 from the program manager 613, calculates the operation trajectory of the control point of the robot 3 by executing interpolation processing based on this operation plan, and inputs to the kinematics controller 653.

The kinematics controller 653 calculates the angle of each joint of the robot 3 as a target angle by performing kinematics computation based on the operation trajectory calculated by the trajectory controller 652, and sends these target angles to the servo controller 654.

The servo controller 654 generates a robot control signal to the robot 3 by feedback controlling each servo motor of the robot 3 so that the target angle of each joint sent from the kinematics controller 653 is realized, and inputs to the servo motors of the robot 3. In addition, the servo controller 654, when receiving the operation plan of the tool 32 sent from the program manager 613, generates an I/O signal for driving the tool 32 in accordance with this operation plan, and inputs to the tool 32.

In the robot control device 6, when receiving the robot command or robot command group sent from the numerical control device 5, in the above way, the robot program generation unit 61 generates a robot program based on this robot command or robot command group, and subsequently when receiving a robot program launch command sent from the numerical control device 5, the operation control unit 65 starts the robot program, and controls operation of the robot 3 or tool 32 based on this robot program.

Next, the flow of various signals and information in the numerical control system 1 configured in the above way will be explained while referencing FIGS. 3 to 6.

FIG. 3 is a view showing an example of a main program of a numerical control program for the machine tool read by the machine tool control module 50 (shown on left side in FIG. 3), and a numerical control program for the robot read by the robot control module 51 (shown on right side in FIG. 3).

It should be noted that, hereinafter, a case will be explained of the machine tool control module 50 reading the numerical control program for the machine tool shown on the left side in FIG. 3, and starting execution, after execution of the main program on the right side in FIG. 3 by the robot control module 51 has completed (i.e. after command "M30" indicating program end written in the sequence number "N11" of the main program was executed in the robot control module 51). In other words, hereinafter, a case will be explained of the robot control module 51 executing the main program shown on the right side in FIG. 3, during execution stop of the numerical control program for the machine tool in the machine tool control module 50, and during stop of axial movement of the machine tool 2.

FIG. 4 is a view showing an example of a sub-program of the numerical control program for the robot read by the robot control module 51. More specifically, FIG. 4 exemplifies a sub-program designated by sub-program number "2000".

Figure 5:
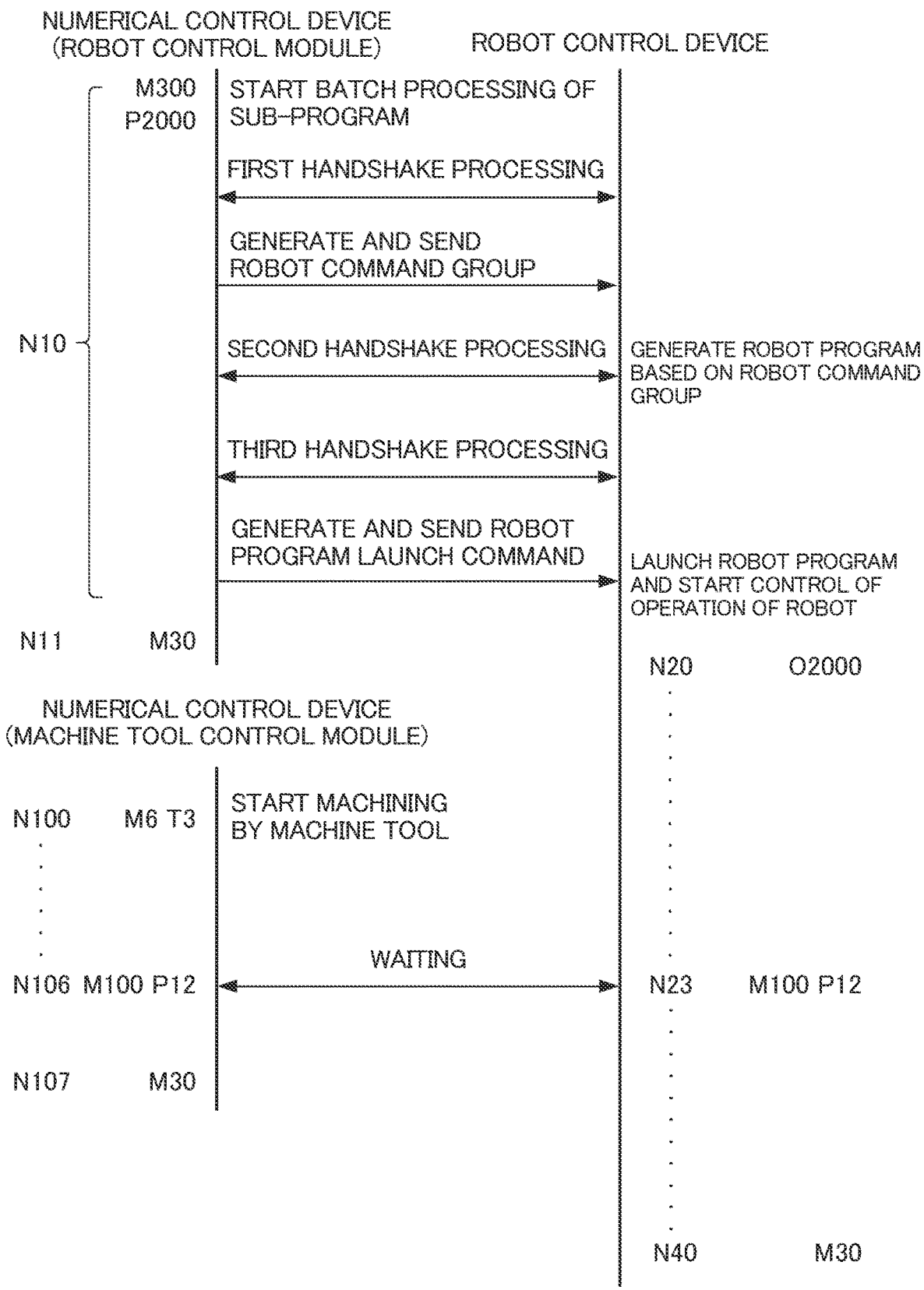
FIG. 5 is a sequence diagram showing the flow of signals and information between the numerical control device and robot control device, processing executed in the numerical control device, and processing executed in the robot control device.

FIG. 5 is a sequence diagram showing the flow of signals and information between the numerical control device 5 and robot control device 6 in the case of running the numerical control device 5 based on the numerical control program exemplified in FIG. 3, the processing executed in the numerical control device 5, and processing executed in the robot control device 6.

First, in the robot command block indicated in sequence number "N10", the batch processing designation command "M300" and the command "P2000" designating the sub-program (refer to FIG. 4) of the sub-program number "2000" are inputted to the input analysis unit 54 of the robot control module 51. The robot control module 51 thereby sends the robot command group and robot program launch command in accordance with the batch processing sequence shown in FIG. 6.

Figure 6:
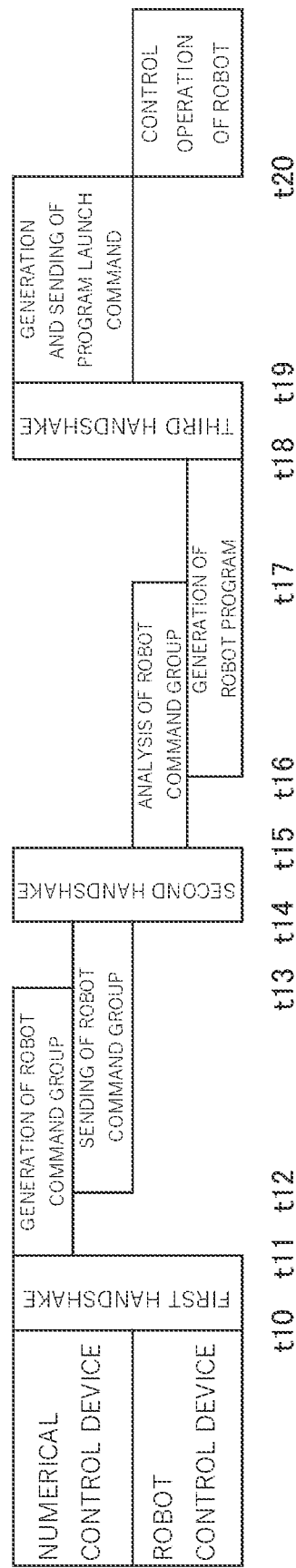
FIG. 6 is an example of a time chart showing a sequence of various processing executed by a robot control module and robot control device upon sending a robot command group and a robot program launch command by batch processing.

FIG. 6 is an example of a time chart showing the sequence of various processing executed by the robot control module 51 and robot control device 6 upon sending the robot command group and robot program launch command by batch processing.

First, between times t10 to t11, the data transmission unit 59 of the robot control module 51 and the data transmission unit 69 of the robot control device 6 execute first handshake processing to start transmission of various commands under the handshake communication.

Between times t11 to t13, the robot command generation unit 55 of the robot control module 51 defines all robot command blocks included in the sub-program shown in FIG. 4 as the designated block range, generates several robot commands based on all robot command blocks included in this designated block range (robot command block shown in sequence numbers "N20" to "N40"), and sequentially writes these several robot commands into the data transmission unit 69.

After starting the generation of a robot command by the robot command generation unit 55 at time t11 and later, the data transmission unit 59 bundles the several robot commands sequentially generated by the robot command generation unit 55 as a robot command group, and sends to the data transmission unit 69 between times t12 to t14. It should be noted that, although FIG. 6 shows a case of concurrently performing the generation of robot commands by the robot command generation unit 55 and the sending of the robot command group by the data transmission unit 59, the present disclosure is not limited thereto. After generating the robot command based on all robot command blocks belonging to the designated block range by the robot command generation unit 55, these robot commands may be sent by the data transmission unit 59.

Subsequently, between times t14 and t15, the data transmission unit 59 and data transmission unit 69 execute second handshake processing in response to transmission of the robot command group completing.

Subsequently, between times t15 to t17, the input analysis unit 60 of the robot control device 6 performs analysis of the several robot commands included in the robot command group received by the data transmission unit 69, and sends the analysis results sequentially to the robot program generation unit 61. After starting the analysis of robot commands by the input analysis unit 60 at time t15 and later, the robot program generation unit 61 generates a robot program based on several robot commands belonging to the robot command group between times t16 to 18.

Subsequently, between times t18 to t19, the data transmission unit 59 and data transmission unit 69 execute third handshake processing in response to the generation of the robot program by the robot program generation unit 61 completing.

Subsequently, between times t19 to t20, the robot program launch command unit 56 of the robot control module 51 generates a robot program launch command, after confirming that the generation of a robot program on the side of the robot control device 6 has completed by the above third handshake processing, and writes this into the data transmission unit 59. In addition, the data transmission unit 59 sends the robot program launch command to the data transmission unit 69.

Subsequently, at time t20 and later, the operation control unit 65 of the robot control device 6 boots the robot program in response to receiving the robot program launch command, and controls operation of the robot 3 based on this robot program.

The robot control module 51 returns to the main program shown in FIG. 3, after sending the robot command group and robot program launch command by the above such batch processing. Subsequently, in the robot command block indicated in sequence number "N11", the command "M30" indicating end program is inputted to the input analysis unit 54 of the robot control module 51. The robot control module 51 thereby ends the main program shown in FIG. 3, and the machine tool control module 50 reads the numerical control program for the machine tool shown in FIG. 3. It should be noted that, as shown in FIG. 5, while the machine tool control module 50 reads the numerical control program for the machine tool, and controls operation of the machine tool 2 based on this numerical control program, the robot control device 6 controls the operation of the robot 3 concurrently in accordance with the robot program generated based on the above-mentioned robot command group.

First, in the machine tool command block indicated in sequence number "N100", the command "M6 T3" for changing the tool mounted to the spindle of the machine tool 2 to the tool indicated by tool number "3" is inputted to the machine tool control module 50. The machine tool control module 50 thereby changes the tool mounted to the spindle of the machine tool 2 to the tool indicated by tool number "3".

Subsequently, in the machine tool command block indicated in sequence number "N101, the command "S1500" for rotating the spindle of the machine tool 2 at the speed "1500" is inputted to the machine tool control module 50. The machine tool control module 50 thereby rotates the spindle of the machine tool 2 at the speed "1500".

Subsequently, in the machine tool command block indicated in sequence numbers "N102" to "N105", G code "G00" for positioning the spindle of the machine tool 2 and G code "G01" for transitioning the spindle of the machine tool 2 by linear interpolation are inputted to the machine tool control module 50. The machine tool control module 50 thereby positions the spindle to the position designated by G code "G00", and moves to the position and speed designated by G code "G01", thereby cutting the workpiece (not shown).

Subsequently, in the machine tool command block indicated by sequence number "N106", the command "M100" for waiting for the processing in the robot control device 6 is inputted to the machine tool control module 50. The machine tool control module 50 thereby transitions to the machine tool command block indicated in the next sequence number "N107", after confirming that the execution of the robot program until the robot command block indicated by sequence number "N23" in the sub-program shown in FIG. 4 has completed on the side of the robot control device 6. In addition, the robot control device 6 simultaneously starts execution of the robot program corresponding to the robot command block of sequence number "N24" and later, among the sub-program shown in FIG. 4, after confirming that processing until the machine tool command block indicated in sequence number "N107" has completed in the numerical control program for the machine tool shown in FIG. 3, on the side of the machine tool control module 50.

Subsequently, in the machine tool command block indicated in sequence number "N107", the command "M30" indicating the end program is inputted to the machine tool control module 50. The machine tool control module 50 thereby ends the numerical control program for the machine tool shown in FIG. 3.

According to the present embodiment, the following effects are exerted. In the present embodiment, the robot command generation unit 55 of the numerical control device 5 generates the robot command for every robot command block based on the numerical control program for the robot including the several robot command blocks related to the robot 3, and the data transmission unit 59 of the numerical control device 5 bundles in advance the several robot commands generated based on the several robot command blocks belonging to the designated block range as a robot command group, and sends to the robot control device 6. In addition, the robot program generation unit 61 of the robot control device 6 generates the robot program based on the robot commands received by the data transmission unit 69 of the robot control device 6, and the operation control unit 65 of the robot control device 6 launches the robot program in response to receiving the program launch command by the data transmission unit 69, after the robot program is generated based on the robot command group, and controls operation of the robot 3 and tool 32 based on this robot program. According to the present embodiment, by bundling in advance the robot command group constituted by several robot commands and sending to the side of the robot control device 6 from the side of the numerical control device 5, since it is possible to drastically reduce the execution frequency of first to third handshake processing, which had been necessary every time sending a robot command based on one robot command block conventionally, it is possible to shorten the time required in communication processing between the numerical control device 5 and robot control device 6 by this amount, and consequently also shorten the cycle time of the robot control.

In the present embodiment, the data transmission unit 59 and data transmission unit 69 execute the first handshake processing upon the data transmission unit 59 starting the sending of the robot command group, and executes the second handshake processing upon the data transmission unit 69 completing reception of the robot command group. It is thereby possible to appropriately send the robot command group configured by several robot commands to the data transmission unit 69 from the data transmission unit 59. In addition, the data transmission unit 59 and data transmission unit 69 execute the third handshake processing upon the generation of a robot program based on the robot command group being completed by the robot program generation unit 61. The numerical control device 5 can thereby grasp that the generation of a robot program on the side of the robot control device 6 has completed.

In the present embodiment, the data transmission unit 59 sends the program launch command to the data transmission unit 69 after executing the third handshake processing. The numerical control device 5 can thereby launch this robot program, after the robot program is appropriately generated on the side of the robot control device 6.

In the present embodiment, the designated block range related to batch processing by the data transmission unit 59 is set by the batch processing designation command, based on the numerical control program for the robot. The user creating a numerical control program can thereby easily designate a robot command block related to batch processing.

In the present embodiment, the input analysis unit 54, robot command generation unit 55, robot program launch command unit 56, as well as data transmission unit 59 execute analysis of the robot command block, generation of the robot command, generation of the robot program launch command, as well as sending of the robot command group and robot program launch command, during execution stop of the numerical control program for the machine tool in the machine tool control module 50 and during stop of axial movement of the machine tool 2. The robot control module 51 can thereby execute a series of processing related to generation and sending of the robot command group and robot program launch command using a period in which the computational load is low in the machine tool control module 50; therefore, it is possible to shorten the time required in this series of processing.

Second Embodiment

Hereinafter, a numerical control system related to a second embodiment of the present disclosure will be explained by referencing the drawings. It should be noted that, in the following explanation, the same reference symbols are attached to configurations which are the same as the numerical control system 1 according to the first embodiment, and detailed explanations thereof will be omitted.

Figure 7:
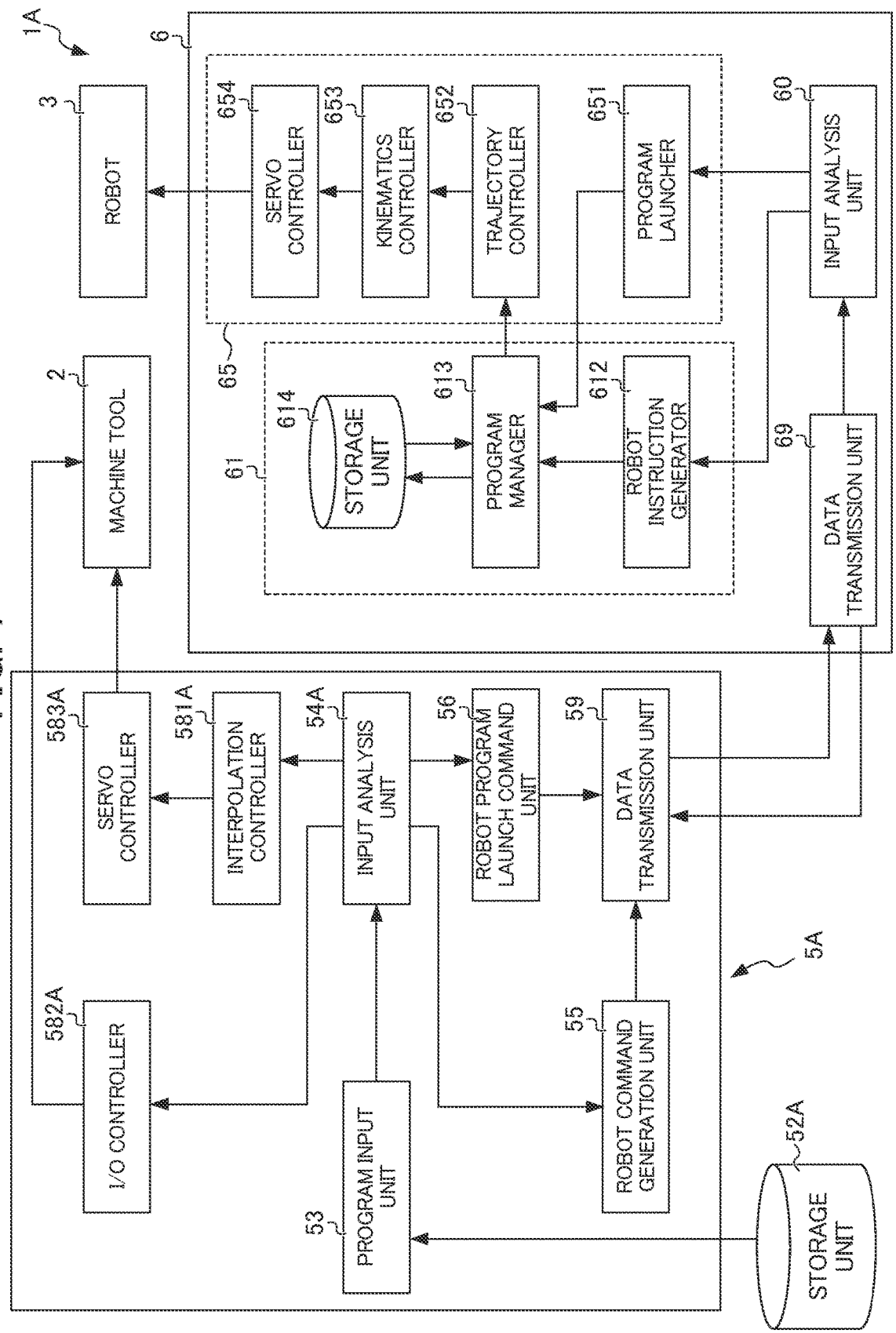
FIG. 7 is a functional block diagram of a numerical control device and robot control device of a numerical control system according to a second embodiment of the present disclosure.

FIG. 7 is a functional block diagram of a numerical control device 5A and a robot control device 6 of a numerical control system 1A according to the present embodiment. The numerical control system 1A according to the present embodiment differs in configuration of the numerical control device 5A and numerical control program from the numerical control system 1 according to the first embodiment. More specifically, in the numerical control device 5 according to the first embodiment, the numerical control program is divided into a numerical control program for the machine tool mainly constituted by the machine tool command block for the machine tool 2, and the numerical control program for the robot mainly constituted by the robot command block for the robot 3, and further the execution subject of the numerical control program for this machine tool and the numerical control program for this robot are also divided into the machine tool control module 50 and robot control module 51. In contrast, the numerical control device 5A according to the present embodiment differs from the numerical control device 5 according to the first embodiment in the point of using a program in which the machine tool command block and robot command block coexist as the numerical control program, and sharing the execution subject of this numerical control program.

The numerical control device 5A includes: a storage unit 52A, program input unit 53, input analysis unit 54A, robot command generation unit 55, robot program launch command unit 56, data transmission unit 59, interpolation controller 581A, I/O controller 582A and servo controller 583A.

In the storage unit 52A, several numerical control programs created based on the operation by the operator are stored, for example. More specifically, in the storage unit 52A, a numerical control program in which both machine tool command blocks for the machine tool 2 and robot command blocks for the robot 3 coexist, a sub-program including mainly robot command blocks, etc. are stored.

The input analysis unit 54A analyzes the command classification for every command block based on the numerical control program inputted from the program input unit 53, and the analysis results thereof are sent to the robot command generation unit 55, robot program launch command unit 56, interpolation controller 581A, and I/O controller 582A for every command block.

In the numerical control program stored in the storage unit 52A, both the machine tool command block and robot command block coexist. For this reason, the input analysis unit 54A, in the case of the command block inputted from the program input unit 53 being the robot command block, sends the analysis results thereof to the robot command generation unit 55 and robot program launch command unit 56. It should be noted that, since the processing of the robot command generation unit 55, robot program launch command unit 56 and data transmission unit 59 hereinafter is the same as the numerical control device 5 according to the first embodiment, detailed explanations are omitted.

In addition, the input analysis unit 54A, in the case of the command block inputted from the program input unit 53 being the machine tool command block, sends the analysis results thereof to the interpolation controller 581A and I/O controller 582A.

The interpolation controller 581A calculates the movement path of the control axis according to the command by performing interpolation processing, in the case of the analysis result sent from the input analysis unit 54A commanding movement of the control axis of the machine tool 2, and inputs the calculated movement path to the servo controller 583A. The servo controller 583A feedback controls the servo motor of the machine tool 2, so that the control axis moves along the movement path calculated by the interpolation controller 581A. The operation of the machine tool 2 is thereby controlled according to the sequence decided by the numerical control program.

In addition, the I/O controller 582A inputs an I/O signal according to the inputted command to the machine tool 2, in the case of the analysis results sent from the input analysis unit 54A commanding the opening/closing of the chuck of the machine tool 2, or a case of commanding opening/closing of a door of the machine tool 2, for example. The chuck and door of the machine tool 2 are thereby opened/closed according to the sequence decided by the numerical control program.

Next, the flow of various signals and information of the numerical control system 1A configured in the above way will be explained while referencing FIGS. 8 to 10.

FIG. 8 is a view showing an example of a main program of the numerical control program read by the numerical control device 5A. It should be noted that, in the main program shown in FIG. 8, the command blocks indicating sequence numbers "N200" and "N207" are robot command blocks for the robot 3, and the command blocks indicating sequence numbers "N201" to "N206" are machine tool command blocks for the machine tool 2.

FIG. 9A and FIG. 9B are views showing examples of sub-programs read by the numerical control device 5A. More specifically, FIG. 9A exemplifies a sub-program designated by the sub-program number "3000", and FIG. 9B exemplifies a sub-program designated by the sub-program number "4000". It should be noted that the command blocks included in the sub-programs shown in FIG. 9A and FIG. 9B are all robot command blocks for the robot 3.

Figure 10:
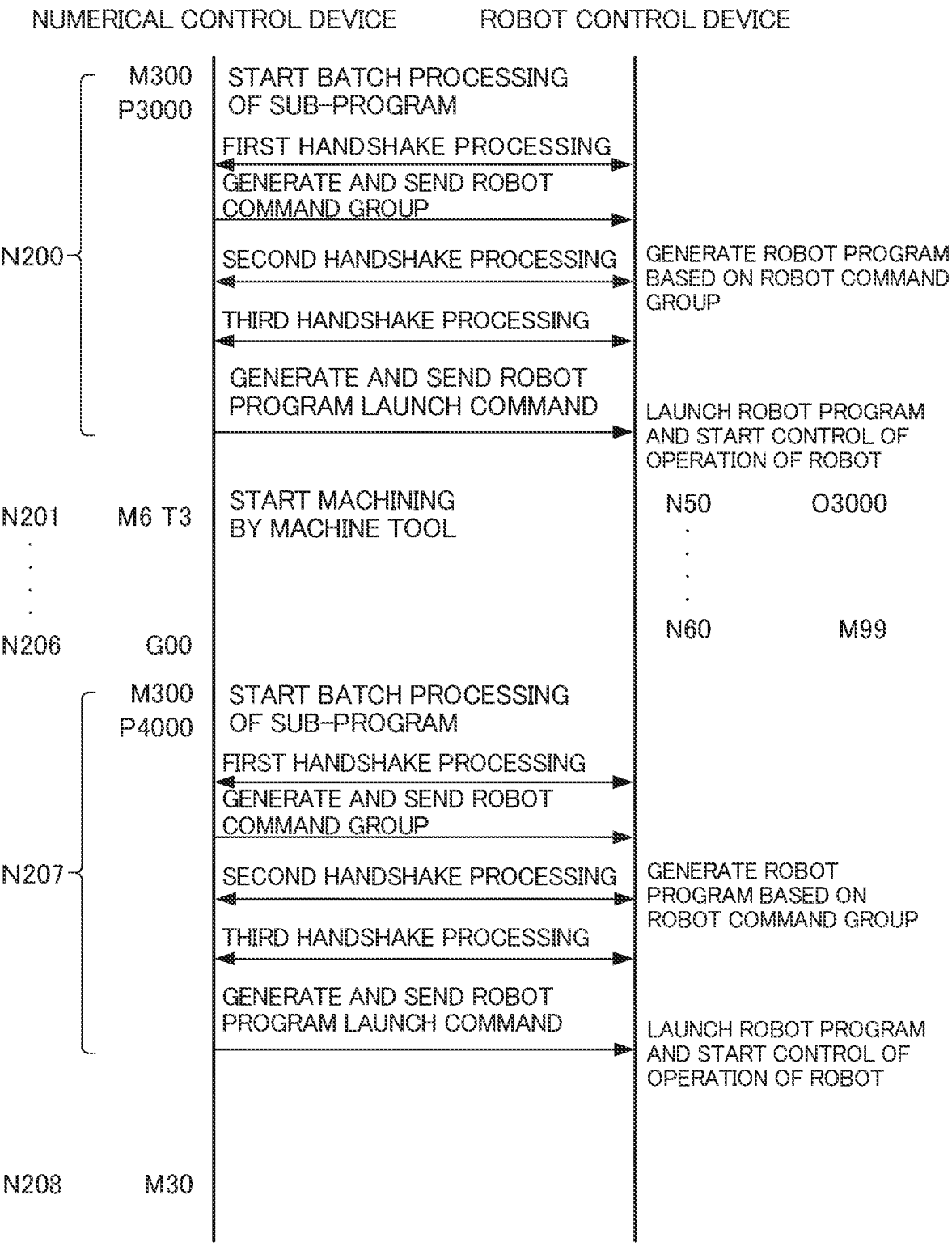
FIG. 10 is a sequence diagram showing the flow of signals and information between the numerical control device and robot control device, processing executed in the numerical control device, and processing executed in the robot control device.

FIG. 10 is a sequence diagram showing the flow of signals and information between the numerical control device 5A and robot control device 6 in the case of operating the numerical control device 5A based on the numerical control program exemplified in FIG. 8, the processing executed in the numerical control device 5A and processing executed in the robot control device 6.

First, in the robot command block indicated in the sequence number "N200", the command "P3000" designating the sub-program of sub-program number "3000" (refer to FIG. 9A) together with the batch processing designation command "M300" are inputted to the input analysis unit 54A of the numerical control device 5A. The robot command generation unit 55, robot program launch command unit 56 and data transmission unit 59 of the numerical control device 5A thereby send the robot command group and robot program launch command by batch processing similarly to the first embodiment. It should be noted that, since this batch processing sequence is the same as the sequence explained by referencing FIG. 6, detailed explanation is omitted.

Next, in the machine tool command block indicated by sequence number "N201", the command "M6 T3" for changing the tool mounted to the spindle of the machine tool 2 to the tool indicated by tool number "3" is inputted to the input analysis unit 54A. The I/O controller 582A thereby inputs, to the machine tool 2, an I/O signal for changing the tool mounted to the spindle of the machine tool 2 to the tool indicated by the tool number "3". The tool mounted to the spindle is thereby changed.

Subsequently, in the machine tool command block indicated in sequence number "N202", the command "S1500" for rotating the spindle of the machine tool 2 at speed "1500" is inputted to the input analysis unit 54A. The I/O controller 582A thereby inputs the I/O signal for rotating the spindle at the designated speed to the machine tool 2. The spindle thereby rotates at the designated speed.

Subsequently, in the machine tool command blocks indicated by sequence numbers "N203" to "N206", the G code "G00" for positioning the spindle of the machine tool 2 and the G code "G01" for moving the spindle of the machine tool 2 by linear interpolation are inputted to the input analysis unit 54A. The servo controller 583A positions the spindle to the position designated by the G code "G00", and cuts the workpiece (not shown) by moving the spindle to the position and speed designated by the G code "G01".

Subsequently, in the robot command block indicated by sequence number "N207", the command "P4000" designating the sub-program of the sub-program number "4000" (refer to FIG. 9B) is inputted together with the batch processing designation command "M300" to the input analysis unit 54A. The robot command generation unit 55, robot program launch command unit 56 and data transmission unit 59 thereby send the robot command group and robot program launch command by batch processing similarly to the first embodiment. It should be noted that, since this batch processing sequence is the same as the sequence explained by referencing FIG. 6, detailed explanation is omitted.

Subsequently, in the command block indicated by sequence number "N208", the command "M30" indicating end program is inputted to the input analysis unit 54A. The numerical control device 5A thereby ends the numerical control program shown in FIG. 8.

It should be noted that, as shown in FIG. 10, the robot command generation unit 55, robot program launch command unit 56 and data transmission unit 59 of the numerical control device 5A preferably execute the generation of the robot command, generation of the robot program launch command, and sending of the robot command group and robot program launch command, during execution stop of the machine tool command block for the machine tool 2 and during stop of axis movement of the machine tool 2, among the numerical control program.

According to the present embodiment, the same effects as the first embodiment are exerted. In addition, the present disclosure is not limited to the above-mentioned embodiments, and various changes and modifications thereto are possible.

For example, the above-mentioned embodiments explain a case of providing the robot command generation unit 55 which generates robot commands for every robot command block based on the numerical control program to the numerical control devices 5, 5A, and providing the robot program generation unit 61 which generates the robot program based on the robot commands received by the data transmission unit 69 to the robot control device 6; however, the present disclosure is not limited thereto. This robot command generation unit 55 and robot program generation unit 61 may be provided to an external arithmetic unit connected to be communicable with the numerical control devices 5, 5A and robot control device 6, and execute the processing generating this robot command and/or robot program by the external arithmetic unit.

EXPLANATION OF REFERENCE NUMERALS

1, 1A numerical control system
2 machine tool
3 robot
5, 5A numerical control device
50 machine tool control module
51 robot control module
52, 52A storage unit
53 program input unit
54, 54A input analysis unit
55 robot command generation unit
56 robot program launch command unit
581A interpolation controller
582A I/O controller
583A servo controller
59 data transmission unit (first communication unit)
6 robot control device
60 input analysis unit
61 robot program generation unit
612 robot instruction generator
613 program manager
614 storage section
65 operation control unit
651 program launcher
652 trajectory controller
653 kinematics controller
654 servo controller
69 data transmission unit (second communication unit)

The invention claimed is:
1. A numerical control system comprising:
a numerical control device configured to control operation of a machine tool, and generate a robot command for controlling operation of a robot;
a robot control device configured to be communicable with the numerical control device and control operation of the robot based on the robot command;
a robot command generation unit configured to generate, based on a numerical control program including a plurality of robot command blocks for the robot, the robot command for each of the robot command blocks;
a robot program launch command unit configured to generate a program launch command;
a first communication unit provided to the numerical control device and configured to send the program launch command to the robot control device, after bundling in advance a plurality of the robot commands generated based on a plurality of the robot command blocks belonging to a designated block range as a robot command group and sending to the robot control device;
a second communication unit provided to the robot control device and configured to receive the robot command and the program launch command;

a robot program generation unit configured to generate a robot program based on the robot command received by the second communication unit; and an operation control unit configured to, in response to receiving the program launch command by the second command unit after the robot program is generated based on the robot command group by the robot program generation unit, launch the robot program, and control operation of the robot based on the robot program, wherein the first communication unit is configured to switch between batch processing, which sends the robot command group composed of a plurality of the robot commands to the second communication unit and then sends the program launch command to the second communication unit, and sequential processing, which sends one robot command and program launch command to the second communication unit for every one robot command block.

2. The numerical control system according to claim 1, wherein the first communication unit and the second communication unit:

execute a first handshake processing upon the first communication unit starting communication of the robot command group;

execute a second handshake processing upon the second communication unit completing receiving of the robot command group; and execute a third handshake processing upon generation of the robot program based on the robot command group completing by the robot program generation unit.

3. The numerical control system according to claim 2, wherein the first communication unit sends the program launch command to the second communication unit after executing the third handshake processing.

4. The numerical control system according to claim 1, wherein the designated block range is decided based on the numerical control program.

5. The numerical control system according to claim 1, wherein the numerical control device controls operation of the machine tool, based on a numerical control program for machine tools including a plurality of machine tool command blocks, and wherein the robot command generation unit, the robot program launch command unit, and the first communication unit execute acquisition of the robot command, generation of the program launch command, and sending of the robot command group and the program launch command, during stop of the numerical control program for the machine tool.

6. The numerical control system according to claim 1, wherein the numerical control device controls operation of the machine tool based on a numerical control program for machine tools including a plurality of machine tool command blocks, and wherein the robot command generation unit, the robot program launch command unit and the first communication unit execute acquisition of the robot command, generation of the program launch command and sending of the robot command group and the program launch command during stop of axis movement of the machine tool.

7. The numerical control system according to claim 1, wherein the numerical control device includes the robot command generation unit, the robot program launch command unit and the first communication unit, and wherein the robot control device includes the second communication unit, the robot program generation unit and the operation control unit.

8. The numerical control system according to claim 1, further comprising an external arithmetic device which is communicably connected with the numerical control device and the robot control device, wherein the external arithmetic device includes the robot command generation unit and the robot program generation unit.

9. A control method for an industrial machine using a numerical control system including a numerical control device that controls operation of a machine tool and a robot control device which is communicable with the numerical control device and controls operation of a robot, to control operation of the machine tool and the robot, the control method comprising the steps of:

the numerical control device generating, based on a numerical control program including a plurality of robot command blocks for the robot, a robot command for controlling operation of the robot for each of the robot command blocks;

the numerical control device generating a program launch command;

the numerical control device executing batch processing to bundle in advance a plurality of the robot commands generated based on a plurality of the robot command blocks belonging to a designated block range as a robot command group, and send to the robot control device;

the numerical control device executing sequential processing to send one robot command to the robot control device for every one robot command block;

the robot control device receiving the robot command group or one robot command;

the robot control device generating a robot program based on a plurality of the robot commands belonging to the robot command group or one robot command;

the numerical control device sending a program launch command to the robot control device, after the robot program is generated in the robot control device; and the robot control device launching the robot program in response to receiving the program launch command, and controlling operation of the robot based on the robot program.

* * * * *